March 29, 1960     R. W. GILBERT     2,930,973
INTEGRATING MAGNETIC FLUXMETER
Filed March 19, 1956
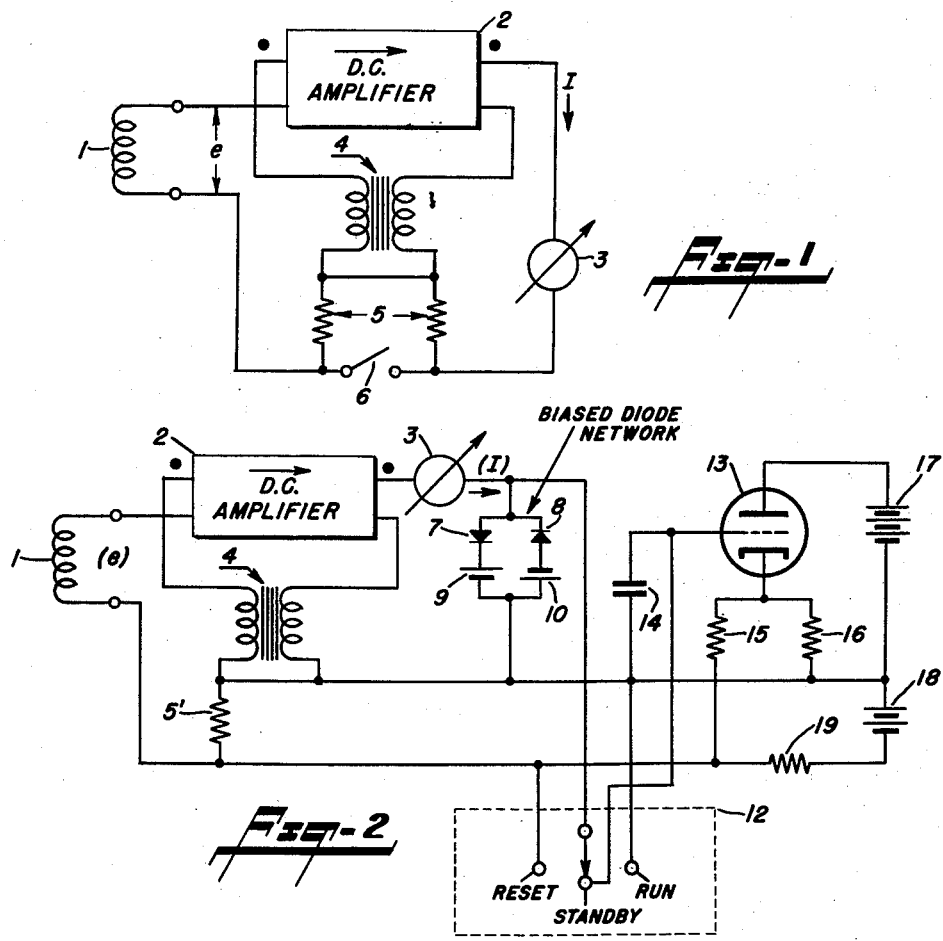
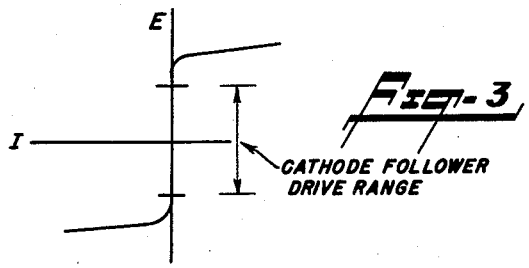
ROSWELL W. GILBERT
INVENTOR.
BY
ATTORNEY United States Patent Office 2,930,973
Patented Mar. 29, 1960

2,930,973

INTEGRATING MAGNETIC FLUXMETER

Roswell W. Gilbert, Montclair, N.J., assignor to Daystrom, Incorporated, Murray Hill, N.J., a corporation of New Jersey Application March 19, 1956, Serial No. 572,536

12 Claims. (Cl. 324—43)

This invention relates to a magnetic fluxmeter of the potential-time integrating type and more particularly to a fluxmeter of the kind including a circuit which automatically compensates for drift from a true reading.

Fluxmeters are commonly used in the testing of magnetic materials. One application for the fluxmeter is the measuring of B-H curves on the magnetic material under test.

Fluxmeters are subject to drift from a true reading, which drift is normally termed "zero drift," by reason of spurious potentials within the input circuit. With the fluxmeters which are in use today, it is necessary to continuously condition the fluxmeter for operation upon very short notice by manually correcting for zero drift. Time, however, is not conveniently available for manual conditioning of the fluxmeter on short notice. With this invention the magnetic fluxmeter is corrected for zero drift automatically and continuously so that it will at all times be in condition for immediate service by a simple switching selection.

An object of this invention is the provision of an apparatus for detecting a changing magnetic flux which is capable of providing readings which are more accurate and reliable than heretofore possible.

An object of this invention is the provision of an apparatus for detecting a changing magnetic flux field which automatically compensates for drift influences up to the instant of taking a magnetic flux change reading, and continues the level of drift compensation which obtained just prior to the taking of the magnetic flux change reading.

An object of this invention is the provision of an integrating magnetic fluxmeter of the kind having an automatic zero drift compensator.

An object of the invention is the provision of an integrating magnetic fluxmeter which includes an electrical circuit for automatically compensating for drift of the fluxmeter.

An object of this invention is the provision of an integrating magnetic fluxmeter having reset, standby and run positions, said fluxmeter comprising a pick-up coil adapted to link with a changing magnetic flux whereby a signal potential is developed in said pick-up coil; a D.-C. amplifier having an input and output circuit, said D.-C. amplifier being connected to said pick-up coil; a mutual inductance which is connected to both the said input and output circuits; a biased rectifier network in the D.-C. amplifier output circuit effective when the fluxmeter is in the standby position, said biased rectifier network developing an appreciable voltage swing upon small changes in output circuit current resulting from spurious potentials in the D.-C. amplifier input circuit; a buffer stage having as an input said voltage swing from said biased rectifier network, the output from said buffer stage providing a compensative feedback voltage to the input circuit of said D.-C. amplifier whereby said spurious potentials are feedback-balanced when the fluxmeter is in the standby position; a holding capacitor in the input circuit of the said buffer stage, which holding capacitor assumes a charge proportional to the voltage swing from the said biased rectifier network, whereby the buffer stage provides a steady feedback signal to the D.-C. amplifier while the fluxmeter is in the run position, said D.-C. amplifier signal potential being feedback-balanced through said mutual inductance when the fluxmeter is in the run position, whereby a signal is developed at the D.-C. amplifier output circuit; means measuring said output signal, the change in signal being proportional to the change in magnetic flux linked by the pick-up coil; direct feedback means wherein the said D.-C. amplifier output circuit is directly coupled to said D.C. amplifier input circuit through a mutual resistor when the fluxmeter is in the reset position; and switch means whereby the fluxmeter may be switched to any of the said reset, standby and run positions.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings, wherein like reference characters denote like parts,

Figure 1 is a schematic circuit diagram of one type of basic integrating fluxmeter;

Figure 2 is a schematic circuit diagram of the improved integrating fluxmeter of this invention which includes an automatic drift compensator; and Figure 3 is a volt-ampere characteristic curve of the biased diode network which is contained in the automatic drift compensator circuit included in Figure 2.

Referring to Figure 1 of the drawings, one basic type integrating fluxmeter, which is particularly adapted for use with the improved fluxmeter of this invention, is shown comprising a pickup coil 1 which is coupled to a D.-C. amplifier. The output from the D.-C. amplifier passes through an ammeter 3 and the primary winding of a mutual inductor 4. The secondary winding of the mutual inductor is connected to the input of the D.-C. amplifier 2 in such a manner as to result in negative feedback. The ammeter 3 therefore measures the amplifier output current which results from the error difference between the signal input voltage derived from the changing flux in the pick-up coil, and the amount of voltage fed back through the mutual inductor 4.

The pick-up coil 1 which is arranged to link with the magnetic flux change to be measured, will develop a potential $e$ that is a function of the rate of change of the linked magnetic flux B. This potential $e$ may be expressed $$e = AN \, (dB/dt) \tag{1}$$

wherein A and N are constants which are equal to the mean coil area and the number of coil turns, respectively, and $t$ is time. Integrating (1)

$$\int e \, dt = \Delta BAN \tag{2}$$

wherein $\Delta B$ is the flux change linked by the pick-up coil.

As mentioned above, the pick-up coil is connected to the D.-C. amplifier 2 which is feedback-balanced by means of feedback through the mutual inductor 4. The input to the amplifier is, therefore, the error voltage which results in an output current I. The amplifier, ideally, has an infinite transfer conductance, and, the feedback-balance will be entirely against the rate of change of output current, as the following formula indicates:

$$e = L \, (dI/dt) \tag{3}$$

wherein L is the mutual inductance of the mutual inductor 4. Integrating (3)

$$\int edt = \Delta IL \quad (4)$$

wherein ΔI is the change in output current. Combining (2) and (4)

$$\Delta B = \Delta I \, (L/AN) \quad (5)$$

which shows that the change in magnetic flux ΔB is directly proportional to the change in output current ΔI, and L/AN is a constant of the fluxmeter.

Normally, the system is preset to zero output current before use so that the change in output current ΔI is the subsequent absolute indicated level of I. The system is preset to zero, or "zeroed," by connecting the resistance network 5 into the feedback path, by the closure of the switch 6. With the switch closed, the resistance network 5 is mutually connected to both the input and output circuits of the D.-C. amplifier, and the system will come to zero exponentially with a time-constant of $$\text{time-constant} = L/R$$

wherein R is the mutual resistance of the network 5. To run, the switch 6 is then opened, putting the system in operating condition, and the pick-up coil 1 subjected to the magnetic flux change to be measured.

A limiting condition with the switch 6 open and the fluxmeter in "run" condition is imposed by drift. Drift is the integration with time of any spurious potentials, particularly thermoelectric potentials, within the input circuit loop. This causes drift of the indicating output current with time, and results in an output current reading on the ammeter 3 without actual change in magnetic flux B. Drift, therefore, limits the time that the system may be left in the run condition.

Usually fluxmeters include a provision for injection of an adjustable compensating potential into the input circuit so that zero drift may be manually compensated by observation and correction. However, the spurious potentials causing drift vary with time in a more or less random manner, and conditioning of the system requires a continuous readjustment of the compensating potential, which is impractical when the fluxmeter must be in continuous readiness for operation without time for preconditioning.

In the fluxmeter of this invention, a conductive feedback path is added to the basic integrating fluxmeter system described above. The added feedback is sufficient to accommodate spurious drift potentials continuously while the system is on standby condition. In addition, the feedback level which obtains at the instant of switching from standby to run condition is maintained during the run condition of the fluxmeter. This level will be the proper compensative correction required at the time of transfer to the run position, and the system will be in condition for minimum drift at any time required. Further, with the fluxmeter of this invention, the output current I is maintained at zero throughout this process, and the automatic compensation is performed without appearance of output current.

Figure 2 of the drawings is a schematic diagram of the novel fluxmeter of this invention wherein there is included circuitry for the correction of drift without demanding output current, and circuitry for freezing the level of feedback due to spurious drift potential at the level obtaining at the time of switching to the run position. A basic integrating system of the type shown in Figure 1, and described above, is disclosed in my Patent No. 2,681,952, dated June 22, 1954, and entitled Integrating System.

Referring to Figure 2, the improved fluxmeter includes a search coil 1, a D.-C. amplifier 2, an ammeter 3, a mutual inductor 4 and a resistor 5', all of which are counterparts to components in the basic integrating fluxmeter shown in Figure 1. The output circuit is passed through a biased rectifier network comprising a parallel pair of opposed and back-potential biased diodes 7 and 8. The bias potentials for the diodes 7 and 8 are supplied by batteries 9 and 10, respectively; the polarity of each of the batteries being such to oppose conduction of the associated diode. A volt/ampere characteristic curve for the biased diode network is shown in Figure 3 of the drawings. The curve shows that the diode circuit will develop an appreciable potential swing over a region wherein the output current is essentially zero.

The circuit also includes a three position selector switch 12 having reset, standby and run positions, and a cathode followed triode tube 13, which is provided with a storage capacitor 14 in the grid circuit thereof, and a pair of cathode resistors 15 and 16 in the cathode circuit. A potential source 17 supplies the cathode follower tube with anode voltage while a potential source 18 having a series resistor 19 provides a source of fixed additional current through the mutual resistor 5'. The polarity of this additional current is opposite to the polarity of that portion of the cathode current which passes through the mutual resistor 5'. In this manner the unidirectional cathode current is able to control a necessarily bidirectional feedback current.

Operation of the novel magnetic fluxmeter circuit will first be described with the switch in the standby position as illustrated in Figure 2 of the drawings. While the switch is in the standby position the system continuously and automatically compensates for spurious drift potentials which appear in the input circuit. The voltage swing which is developed by the diode network in the output circuit of the D.-C. amplifier by reason of the spurious potentials in the input is connected to the common terminal of the switch 12, through the switch to the standby terminal, and thence directly to the grid of the cathode follower tube 13. The cathode follower serves primarily as a zero demand current buffer stage as it requires only a voltage swing to vary the grid bias. A portion of the cathode follower cathode current flows through the resistor 5' which is mutually connected to both the output and input circuits of the D.-C. amplifier 2. The cathode current flow through the resistor 5' is in such a direction that the polarity across the resistor is negative on top and positive on the bottom as viewed in Figure 2. This polarity is opposite to that caused by the potential source 18. The potential source 18 and series resistor 19 are chosen of such a size that the resulting current through the resistor 5' is zero when there are no spurious drift potentials introduced into the system. If a small current due to a spurious potential of one polarity appears at the output of the D.-C. amplifier 2 the biased diode network will change it to an appreciable voltage swing which will be coupled to the grid of the cathode follower. The resultant current through the mutual resistor 5' will be such that it opposes the spurious potential and as a result the ammeter 3 will remain essentially at zero. A spurious potential of opposite polarity will produce a resultant current of opposite polarity in the resistor 5' and again the ammeter 3 will register essentially zero. It is seen then that the system produces a conductive feedback path which is capable of continuous balancing of the spurious potentials within the input loop under standby conditions.

In the standby position the cathode follower normally operates within the range of grid voltage indicated in Figure 3 of the drawings. If the grid voltage becomes higher than that indicated as the driving range in Figure 3, the cathode follower will saturate; and, if the voltage becomes less, it will cut-off. If the drift influence causes the cathode follower to either saturate or to cut-off, the potential across the diode network will rise until the network will pass output current directly to the feedback inductance. This at least will hold the system against unrestrained fall-over which could occur were the output current blocked completely in the standby position.

With the switch 12 in the run position, the system is capable of measuring the amount of change in the flux through the pick-up coil. The initial reading on the ammeter 3 when switching from standby to run will be zero because the ammeter is continuously maintained at zero reading while the switch is in the standby position. The change in current I will, therefore, be the absolute indicated level of current I. The system measures the change in magnetic flux in the same manner as the basic integrating fluxmeter system described in connection with Figure 1. In the run position of the improved magnetic fluxmeter shown in Figure 2, there will, however, be an additional feedback which is equal in amount to the feedback at the instant the system was switched from standby to run. In the run position the cathode follower grid is disconnected from the diode network. Capacitor 14 will, however, hold the grid voltage at the level effective at the instant of switching from standby, thereby "freezing" the feedback level which was effective at the moment of switching; which level provides the proper compensative correction required at the instant of switching. Obviously, the supply voltages to the cathode follower network must be regulated sufficiently to hold the level steady in the run position during the time of the run. Also, the holding capacitor 14 must have a sufficiently long discharge time-constant, including the grid current demand of the cathode follower, to hold the feedback level steady.

As mentioned above, the switch 12 includes a reset position as well as the standby and run positions. The system is reset by simply connecting the output circuit 3 directly to the input circuit through the mutual resistor 5' for direct feedback in the manner of the switch in Figure 1 of the drawings. It will be noted that in the run position the switch is arranged also to short circuit the diode network. This is not functionally necessary but simply removes the additional potential burden upon the amplifier when no purpose is served.

The actual practical system comprises a cascade of amplifiers with additional feedback networks to attain infinite gain, and in practice performance is related almost entirely to the efficacy of the automatic drift compensating function.

An input range for an ordinary integrating magnetic fluxmeter may be 0 to 10,000 maxwell-turns of flux linkage which is equal to 0 to 100 microvolt-seconds. Typically, a fluxmeter will exhibit drift tendencies equivalent to about 1 microvolt within the input circuit. The improved fluxmeter of this invention will compensate for drift tendencies in the range of 2 to 0 to −2 microvolts; which far exceeds the normal drift tendencies. Without the automatic compensating features the drift can become as great as full scale in 100 seconds or about 1 percent in 1 second; but with the automatic compensator drift may be reduced to full scale in 2,000 seconds, or about 1 percent in 20 seconds. As the above typical figures indicate, the fluxmeter of this invention provides more accurate and reliable information than is possible to obtain with an ordinary integrating magnetic fluxmeter.

Having now described my invention in detail in accordance with the requirements of the patent statutes what I desire to protect by Letters Patent of the United States is set forth in the following claims.

I claim:

1. An integrating magnetic fluxmeter subject to spurious input voltage, and having standby and run positions, said fluxmeter comprising a pick-up coil adapted to link with a changing magnetic flux whereby an input signal voltage is produced in said coil; an amplifier having a connection with the pick-up coil to provide as one input the said input signal voltage and a feedback connection with its output to provide as a second input the derivative of the amplifier output while the fluxmeter is in the run position; means measuring the resultant output of the amplifier while the fluxmeter is in the run position; and compensative feedback means providing a feedback signal for the amplifier which is proportional to said spurious voltage appearing at the amplifier input while the fluxmeter is in the standby position.

2. The invention as recited in claim 1 whereby said compensative feedback means provides a steady feedback signal to the amplifier while the magnetic fluxmeter is in the run position, said steady feedback signal magnitude being determined while the magnetic fluxmeter is in the standby position.

3. The invention as recited in claim 1 including a reset position, and direct feedback means wherein the said amplifier output is directly coupled to the amplifier input through a resistor when the fluxmeter is in the reset position; and switch means whereby the fluxmeter may be switched to any of the said run, standby and reset positions.

4. The invention as recited in claim 3 including said compensative feedback means while the fluxmeter is in run position, whereby said compensative feedback means provides a feedback signal to the amplifier which is proportional to the said spurious voltage appearing at the amplifier input at the instant the fluxmeter is switched from standby to run position.

5. An integrating magnetic fluxmeter which includes standby and run positions, and subject to spurious input voltage, said fluxmeter comprising a pick-up coil adapted to link with a changing magnetic flux to be measured whereby a signal voltage is produced in the pick-up coil, the time integral of said signal voltage being proportional to the change in magnetic flux; a D.-C. amplifier having a connection with the pick-up coil to provide as a first input signal the said signal voltage; an impedance network whereby the said D.-C. amplifier output is differentiated, the derivative of said D.-C. amplifier output by a feedback connection between amplifier output and input providing a second input signal to the D.-C. amplifier, said first and second input signals resulting in an error signal to drive the said D.-C. amplifier; means measuring the output of said D.-C. amplifier while the integrating magnetic fluxmeter is in a run position, the change in the output signal being directly proportional to the change in magnetic flux to be measured; and compensative feedback means providing a continuous feedback signal to the D.-C. amplifier which is proportional to spurious signal voltage appearing at the D.-C. amplifier input, whereby the D.-C. amplifier output is maintained at substantially zero while the magnetic fluxmeter is in the standby position.

6. The invention as recited in claim 5 whereby said compensative feedback means provides a steady feedback signal to the D.-C. amplifier while the magnetic fluxmeter is in the run position, said steady feedback signal magnitude being determined while the magnetic fluxmeter is in the standby position.

7. The invention as recited in claim 5 including a reset position and direct feedback means wherein the said D.-C. amplifier output is directly coupled to the D.-C. amplifier input through a resistor when the fluxmeter is in the reset position; and means whereby the fluxmeter may be switched to any of the said run, standby and reset positions.

8. The invention as recited in claim 7 including said compensative feedback means while the fluxmeter is in run position, whereby said compensative feedback means provides a feedback signal to the D.-C. amplifier which is proportional to the said spurious signal voltage appearing at the D.-C. amplifier input at the instant the fluxmeter is switched from standby to run position.

9. An integrating magnetic fluxmeter having run and standby positions, said fluxmeter comprising a pick-up coil adapted to link with a changing magnetic flux whereby a signal potential is developed in said pick-up coil; a D.-C. amplifier having an input and output circuit, said D.-C. amplifier input circuit being connected to said pick-up coil, a mutual inductor which is connected to both the said input and output circuits; a biased rectifier network in the D.-C. amplifier output circuit when the fluxmeter is in the standby position, said biased rectifier network developing an appreciable voltage swing upon small changes in output circuit current resulting from spurious potentials in the D.-C. amplifier input circuit; a buffer stage having as an input said voltage swing from said biased rectifier network, the output from said buffer stage providing a compensative feedback voltage to the input of the said D.-C. amplifier, whereby said spurious potentials are feedback-balanced when the fluxmeter is in standby position; said D.-C. amplifier signal potential being feedback-balanced through said mutual inductor when the fluxmeter is in the run position, whereby an output signal is developed at the D.-C. amplifier output circuit; and means measuring said output signal, the change in output signal being proportional to the change in magnetic flux linked by the pick-up coil.

10. The invention as recited in claim 9 including a holding capacitor in the input circuit of the said buffer stage, which holding capacitor assumes a charge equal to the voltage swing from the said biased diode network, whereby the buffer stage provides a steady feedback signal to the D.-C. amplifier while the fluxmeter is in the run position, said steady feedback signal magnitude being determined by the charge on said holding capacitor while the fluxmeter is in the standby position.

11. The invention as recited in claim 9 including a reset position and direct feedback means wherein the said D.-C. amplifier output circuit is directly coupled to said D.-C. amplifier input circuit through a mutual resistor when the fluxmeter is in the reset position; and switch means whereby the fluxmeter may be switched to any of the said run, standby and reset positions.

12. The invention as recited in claim 11 including a holding capacitor in the input circuit of the said buffer stage, which holding capacitor assumes a charge proportional to the voltage swing from the said biased rectifier network, whereby the buffer stage provides a steady feedback signal to the D.-C. amplifier while the fluxmeter is in the run position, said steady feedback signal magnitude being determined by the charge on said holding capacitor at the instant the fluxmeter is switched from the standby to the run position.

References Cited in the file of this patent

UNITED STATES PATENTS

| | | |
|---|---|---|
| 2,484,587 | Rich | Oct. 11, 1949 |
| 2,535,412 | Harrison et al. | Dec. 26, 1950 |
| 2,586,799 | Elarde | Feb. 26, 1952 |